United States Patent [19]

McGrath

[11] Patent Number: 5,012,694
[45] Date of Patent: May 7, 1991

[54] HIGH SPEED FLYWHEEL
[75] Inventor: Stephen V. McGrath, Knoxville, Tenn.
[73] Assignee: The United States of America as represented by the Department of Energy, Washington, D.C.
[21] Appl. No.: 471,341
[22] Filed: Jan. 29, 1990
[51] Int. Cl.$^5$ .............................................. F16F 15/30
[52] U.S. Cl. ....................................................... 74/572
[58] Field of Search .................................. 74/574, 572
[56] References Cited

U.S. PATENT DOCUMENTS

| 4,341,001 | 7/1982 | Swartout | 74/572 X |
| 4,821,599 | 4/1989 | Medlicott | 74/572 |
| 4,825,983 | 5/1989 | Nakanishi | 74/574 X |
| 4,860,611 | 8/1989 | Flanagan et al. | 74/574 |

Primary Examiner—Rodney M. Lindsey
Attorney, Agent, or Firm—Stephen D. Hamel; William R. Moser; Richard E. Constant

[57] ABSTRACT

A flywheel for operation at high speeds utilizes two or more ringlike components arranged in a spaced concentric relationship for rotation about an axis and an expansion device interposed between the components for accommodating radial growth of the components resulting from flywheel operation. The expansion device engages both of the ringlike components, and the structure of the expansion device ensures that it maintains its engagement with the components. In addition to its expansion-accommodating capacity, the expansion device also maintains flywheel stiffness during flywheel operation.

13 Claims, 3 Drawing Sheets

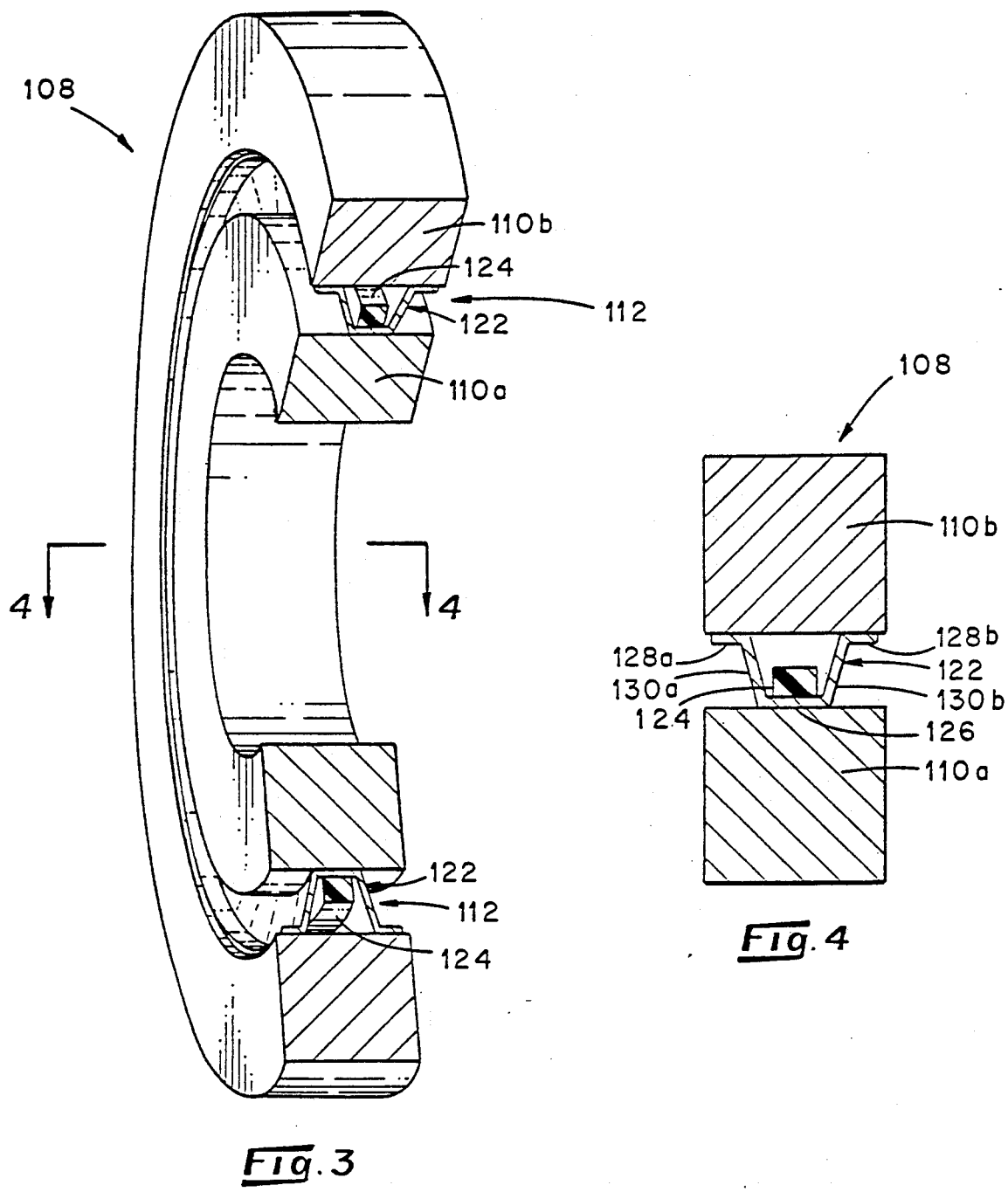

HIGH SPEED FLYWHEEL

The U.S. Government has rights in the invention pursuant to Contract No. DE-AC05-84OR21400 with Martin Marietta Energy Systems, Inc., awarded by the U.S. Department of Energy.

BACKGROUND OF THE INVENTION

This invention relates generally to flywheels and relates more particularly to the construction of a high speed, low-mass flywheel.

Flywheels with which this invention is to be compared include those constructed of circumferentially wound filaments or fibers held together by a matrix or bonding material. Flywheels of such construction are known to possess a relatively high hoop strength but a relatively low radial strength. Hoop-wound flywheels are, therefore, particularly susceptible to circumferential cracks, and the radial stress limitations of such a flywheel substantially limit its speed capabilities.

It is an object of the present invention to provide a new and improved flywheel which experiences reduced radial stress at high operating speeds.

Another object of the present invention is to provide a flywheel whose construction allows for radial growth as flywheel speed increases while providing the necessary stiffness for transferring and maintaining kinetic energy within the flywheel.

Still another object of the present invention is to provide a flywheel having concentrically-disposed component parts wherein rotation induced radial stresses at the interfaces of such component parts approach zero.

Yet another object of the present invention is to provide a flywheel which is particularly well-suited for high speed applications.

SUMMARY OF THE INVENTION

This invention resides in a flywheel including two or more ringlike components arranged in a spaced, concentric relationship for rotation about an axis. The flywheel also includes an expansion device interposed between the ringlike components which is adapted to accommodate radial growth of the ringlike components resulting from flywheel operation. This expansion device includes a resilient support member having an inner portion in engagement with the inner ringlike component and an outer portion in engagement with the outer ringlike component. The support member is adapted to grow radially outwardly during flywheel operation at a faster rate than the outer component so that the outer portion of the support member maintains its engagement with the outer component. The expansion device also includes a support ring positioned about the inner portion of the support member for maintaining the inner portion in engagement with the inner ringlike component during flywheel operation.

BRIEF DESCRIPTION OF THE DRAWINGS

FIG. 3 is a perspective view, shown partially cutaway, of another embodiment of a flywheel made in accordance with the invention.

FIG. 4 is a cross-sectional view taken about on line 4—4 of FIG. 3.

DETAILED DESCRIPTION OF THE ILLUSTRATED EMBODIMENTS

Figure 1:
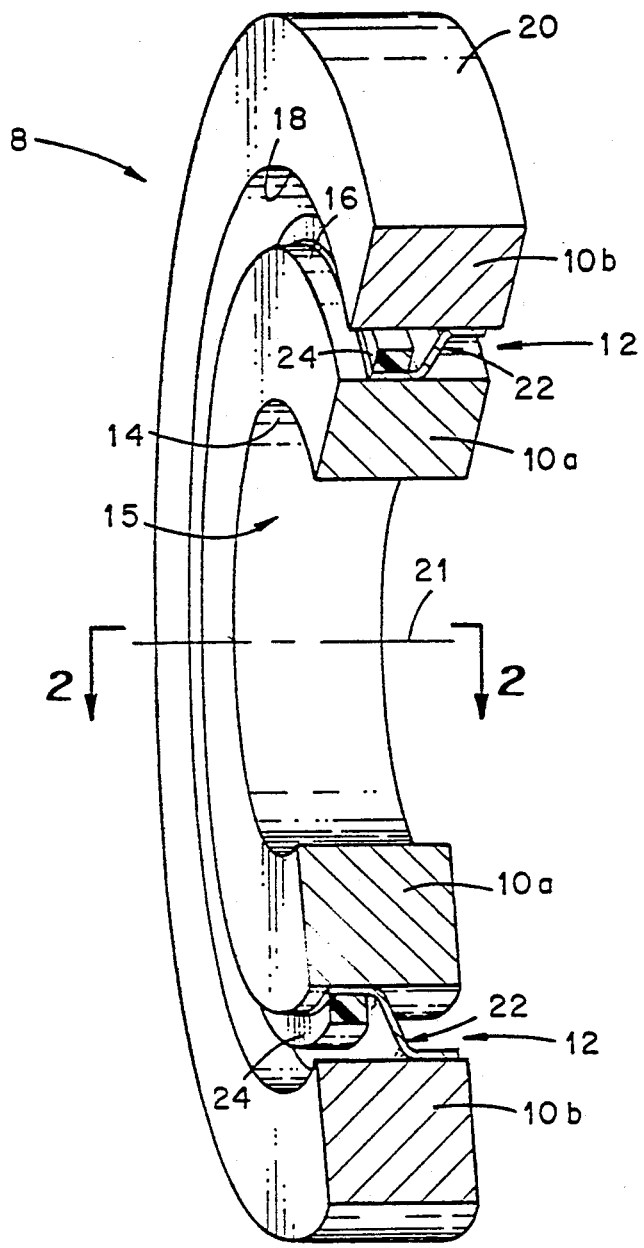
FIG. 1 is a perspective view, shown partially cutaway, of one embodiment of a flywheel made in accordance with the present invention.

Turning to the drawings in greater detail, there is illustrated in FIG. 1 a flywheel 8 including a pair of concentric rings, or ringlike components, 10a, 10b and an expansion device 12 joining the rings 10a, 10b together. The inner ring 10a includes a radially inwardly-directed face 14 providing a central opening 15 for the flywheel 8 and an opposite, radially outwardly-directed face 16. Similarly, the outer ring 10b includes a inwardly-directed face 18 arranged so as to encircle and oppose the inner ring surface 16 and a radially outwardly-directed face 20 opposite the ring face 16. In its environment of intended use, the flywheel 8 is fixed about a shaft (not shown) for rotation therewith about an axis 21 as the shaft extends through the central opening 15 of the flywheel 8.

Although the rings 10a, 10b may be comprised of any number of suitable materials, the rings 10a, 10b of the depicted embodiment 8 are each constructed of a material possessing a relatively low mass and high strength such as fiber reinforced composites. Preferably, the spacing defined between the opposing ring faces 16 and 18 is relatively small so that the volume of flywheel material capable of storing kinetic energy is not appreciably affected.

Figure 2:
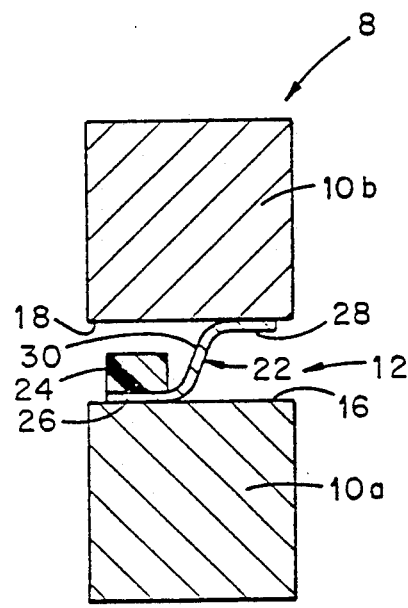
FIG. 2 is a cross-sectional view taken about on line 2—2 of FIG 1.

As best shown in FIG. 2, the expansion device 12 includes a support member 22 having portions, described herein, in contact with the opposing faces 16, 18 of the rings 10a, 10b and a support ring 24 associated with the support member 22. The support member 22 extends completely around the inner ring 10a and is somewhat Z-shaped in cross section. More specifically and with reference to the cross-sectional view of FIG. 2, the support member 22 includes an inner leg portion 26 which flatly engages the inner ring face 16, an outer leg portion 28 which flatly engages the outer ring face 18, and a central portion 30 joining the two leg portions 26, 28. The support member 22 may be fabricated of spring metal, comprised, for example, of steel or aluminum, or from a composite, such as an angle ply laminate overwound with hoop layers.

The support ring 24 engages and extends around the outer surface of the leg portion 26. In the depicted flywheel 8, the support ring 24 is substantially rectangular in cross section and, as shown in FIG. 2, is spaced from the outer ring surface 18.

It is a feature of the present invention that as the flywheel 8 is rotated, the support member 22 grows radially outwardly at a faster rate than do the components 10a and 10b. The support member 22 is maintained in engagement with the inner component 10a by means of the support ring 24 positioned thereabout. To this end, the support ring 24 possesses a modulus of elasticity of such a magnitude that the ring 24 binds the inner leg portion 26 of the support member 22 against the outer face 16 of the inner component 10a during rotation of the flywheel. In this connection, the support ring 24 may be formed from a fiber reinforced composite.

Due to its capacity to accommodate the radial growth of the ringlike components 10a and 10b resulting from flywheel rotation, the expansion device 12 reduces radial stress in the flywheel 8 at operating speeds and thereby reduces the likelihood that the flywheel 8 will experience stress-related damage. Furthermore, since the capability to withstand radial stresses is normally the primary speedlimiting factor in a flywheel, the expansion device 12 permits the flywheel 8 to operate at very high speeds. In fact, since the expansion device 12 provides near zero stresses at the component interfaces 16 and 18, the speed capability of the flywheel 8 approaches an optimum level.

In addition to its stress-reducing function, the expansion device 12 provides the necessary stiffness required to transfer and maintain the full amount of kinetic energy within the flywheel components 10a and 10b. In this connection, it has been found that the stiffness of the flywheel 8 increases with speed due to stress stiffening within the flywheel.

With reference to FIGS. 3 and 4, there is shown a flywheel 108 having a pair of ringlike components 110a and 110b between which is disposed an expansion device 112 for accommodating radial growth of the components 110a and 110b during flywheel rotation. The expansion device 112 includes a support member 122 and a support ring 124. The support member 122 is somewhat hat-shaped in cross section so as to provide an inner portion 126 which engages the outer face of the inner component 110a, a pair of outboard portions 128a and 128b which engage the inner face of the outer component 110b and central portions 130a and 130b joining the inner and outboard portions 126, 128a and 128b in the manner best illustrated in FIG. 4. The support ring 124 is positioned about the inner portion 126 for binding the inner portion 126, and thus the support member 122, in engagement with the inner component 110a. The material out of which the support member 122 is constructed permits it to grow radially outwardly at a faster rate than the outer component 110b so that during flywheel operation, the outboard portions 128a and 128b of the support member 122 are maintained in engagement with the outer component 110b.

Figure 5:
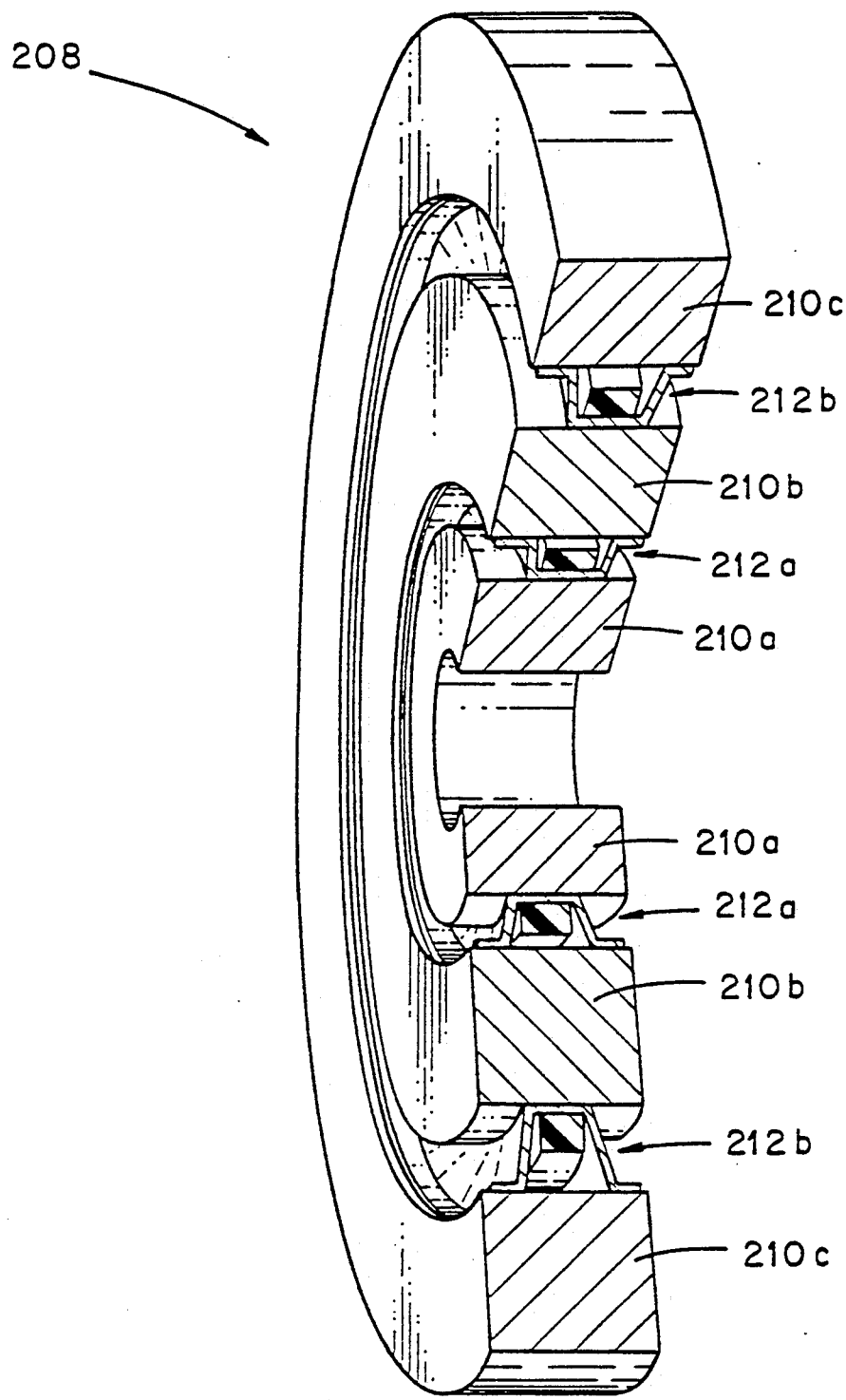
FIG. 5 is a perspective view, shown partially cutaway, of still another embodiment of a flywheel made in accordance with the invention.

It will be understood that numerous modifications and substitutions can be made to the aforedescribed embodiments without departing from the spirit and scope of the invention. For example, although the aforedescribed flywheels 8 and 108 of FIGS. 1-4 have each been shown and described as including only two ringlike components arranged in a spaced, concentric relationship, a flywheel in accordance with the broader aspects of this invention may possess more than two components. For example, there is illustrated in FIG. 5 a flywheel 208 having three concentric ringlike components 210a, 210b and 210c separated by expansion devices 212a and 212b which are each similar in construction to the support means 112 of the flywheel 108 of FIGS. 3 and 4. Accordingly, the aforedescribed embodiments are intended for the purpose of illustration and not as limitation.

What is claimed is:

1. A flywheel comprising:
    at least two ringlike components arranged in a spaced, concentric relationship for rotation about an axis so that one of said components is an inner component and the other of said components is an outer component, each of said components contributing appreciably to the storage of kinetic energy during flywheel operation and constructed of a material possessing a relatively low mass and high strength; and
    an expansion device joining said ringlike components and adapted to accommodate radial growth of said components during flywheel operation, said expansion device including a resilient support member having an inner portion in engagement with the inner ringlike component and an outer portion in engagement with the outer ringlike component and adapted to grow radially outwardly during flywheel operation at a faster rate than said outer component so that during flywheel operation, said outer portion of said support member maintains its engagement with said outer ringlike component, said expansion device also including a support ring positioned about the inner portion of said support member for maintaining the inner portion in engagement with the inner ringlike component during flywheel operation.

2. The flywheel as defined in claim 1 wherein said ringlike components include a pair of spaced-apart radially opposing faces and said expansion device is interposed between said opposing faces.

3. The flywheel as defined in claim 1 wherein said expansion device further includes an intermediate portion joining the inner and outer portions and adapted to resiliently flex during changes in flywheel speed to accommodate radial growth of the flywheel components.

4. The flywheel as defined in claim 3 wherein said support member is generally Z-shaped in cross-section.

5. The flywheel as defined in claim 3 wherein said support member is generally hat-shaped in cross-section.

6. The flywheel as defined in claim 3 wherein said support member is constructed of a spring metal.

7. The flywheel as defined in claim 3 wherein said support ring is adapted to bind said inner portion in engagement with said inner ringlike component during flywheel operation.

8. The flywheel as defined in claim 7 wherein said support ring is formed from a hoop-wound composite.

9. A flywheel comprising:
    at least three ringlike components arranged in a spaced, concentric relationship for rotation about an axis so that one of said components is an inner component, another of said components is an outer component and still another of said components is a middle component, each of said components contributing appreciably to the storage of kinetic energy during flywheel operation and constructed of a material possessing a relatively low mass and high strength; and
    a first expansion device joining the inner component and the middle component and adapted to accommodate radial growth of said inner and middle components during flywheel operation, said first expansion device including a resilient support member having an inner portion in engagement with the inner ringlike component and an outer portion in engagement with the middle ringlike component and adapted to grow radially outwardly during flywheel operation at a faster rate than said middle component so that during flywheel operation, the outer portion of the support member of the first expansion device maintains its engagement with said middle ringlike component, said first expansion device also including a support ring positioned about the inner portion of its support member for maintaining the inner portion of its support member in engagement with the inner ringlike component during flywheel operation; and a second expansion device joining said middle ringlike component and said outer ringlike component and adapted to accommodate radial growth of said middle and outer components during flywheel operation, said second expansion device including a resilient support member having an inner portion in engagement with the middle ringlike component and an outer portion in engagement with the outer ringlike component and adapted to grow radially outwardly during flywheel operation at a faster rate than said outer component so that during flywheel operation, the outer portion of the support member of the second expansion device maintains its engagement with said outer ringlike component, said second expansion device also including a support ring positioned about the inner portion of its support member for maintaining the inner portion of its support member in engagement with the inner ringlike component during flywheel operation.

10. The flywheel as defined in claim 9 wherein said inner and middle ringlike components include a first pair of spaced-apart radially opposing faces and said first expansion device is interposed between said first pair of opposing faces, and said middle and outer ringlike components include a second pair of spaced-apart radially opposing faces and said second expansion device is interposed between said second pair of opposing faces.

11. The flywheel as defined in claim 9 wherein each of said first and second expansion devices includes an intermediate portion joining the inner and outer portions of its support member and adapted to resiliently flex during changes in flywheel speed to accommodate radial growth of the flywheel components.

12. The flywheel as defined in claim 11 wherein the support ring of each expansion device is adapted to bind the inner portion of its corresponding support member in engagement with a corresponding one of the inner and middle ringlike components during flywheel operation.

13. The flywheel as defined in claim 12 wherein each of said support ring is formed from a hoop-wound composite.

* * * * *